US012729742B2

(12) United States Patent
Stewart

(10) Patent No.: US 12,729,742 B2
(45) Date of Patent: Sep. 8, 2026

(54) INTERNAL FLOATING PISTON

(71) Applicant: Fox Factory, Inc., Duluth, GA (US)

(72) Inventor: Matthew Stewart, Buford, GA (US)

(73) Assignee: Fox Factory, Inc., Duluth, GA (US)

( * ) Notice: Subject to any disclaimer, the term of this patent is extended or adjusted under 35 U.S.C. 154(b) by 454 days.

(21) Appl. No.: 17/868,584

(22) Filed: Jul. 19, 2022

(65) Prior Publication Data

US 2023/0027763 A1 Jan. 26, 2023

Related U.S. Application Data

(60) Provisional application No. 63/224,363, filed on Jul. 21, 2021.

(51) Int. Cl.
*F16F 9/32* (2006.01)
*F16F 9/06* (2006.01)
*F16F 9/46* (2006.01)

(52) U.S. Cl.
CPC ............ *F16F 9/3242* (2013.01); *F16F 9/065* (2013.01); *F16F 9/3214* (2013.01)

(58) Field of Classification Search
CPC ....... B60G 13/08; B60G 2202/24; F16F 9/18; F16F 9/348; F16F 9/366; F16F 9/3242; F16F 9/065; F16F 9/3214; F16F 9/46; F16F 9/185
See application file for complete search history.

(56) References Cited

U.S. PATENT DOCUMENTS 5,593,007 A * 1/1997 Siltanen .................. F16F 9/185 188/320
5,967,923 A * 10/1999 Petri ......................... F16F 9/49 474/138
7,240,775 B2 * 7/2007 Nagai ....................... F16F 9/49 188/266
7,377,372 B2 * 5/2008 Wallen .................... F16F 9/512 188/312
8,978,845 B2 * 3/2015 Kim ...................... F16F 9/5126 188/313
9,038,791 B2 * 5/2015 Marking ............... F16F 9/3405 188/316
9,091,320 B1 * 7/2015 Smith ....................... F16F 9/48
9,541,153 B2 * 1/2017 Park ...................... F16F 9/3405
9,546,707 B2 * 1/2017 Kus ........................... F16F 9/48
9,611,915 B2 * 4/2017 Park ...................... F16F 9/5126
9,796,232 B2 * 10/2017 Cox ........................ F16F 9/065
9,834,054 B2 * 12/2017 Teraoka ................ F16F 9/5126
10,167,921 B2 * 1/2019 Flacht ..................... F16F 9/585
10,683,906 B2 * 6/2020 Kus ........................... F16F 9/49
10,704,640 B2 * 7/2020 Galasso .................. F16F 9/065
(Continued)

*Primary Examiner* — Robert A. Siconolfi
*Assistant Examiner* — James K Hsiao

(57) ABSTRACT

Disclosed herein is a shock absorber comprising a cylinder, a rod, a main damping piston, the main damping piston coupled to the rod and configured for operation within the cylinder, the main damping piston configured to divide the cylinder into a compression side and a rebound side, a body cap disposed at one end of the cylinder, wherein the body cap has a second inner diameter greater than an inner diameter of the cylinder, an internal floating piston disposed within the body cap, configured to divide the body cap into a first side and a second side, and a base valve piston disposed to separate the compression side from the first side.

20 Claims, 2 Drawing Sheets

(56) References Cited

U.S. PATENT DOCUMENTS 10,962,081 B2 * 3/2021 Sankaran ............... B60G 13/08
11,091,251 B2 * 8/2021 Brandler ................. B64C 25/62
11,181,161 B2 * 11/2021 Baldoni .................... F16F 9/19
11,311,815 B1 * 4/2022 Trindle ................ A63H 17/262
11,376,914 B2 * 7/2022 Marking ................. F16F 9/346
11,946,526 B2 * 4/2024 Gagnon .................. F16F 9/342
2004/0145099 A1 * 7/2004 Kojima ................... F16F 9/064 188/297
2006/0266602 A1 * 11/2006 Robertson ............... F16F 9/063 188/322.15
2009/0145706 A1 * 6/2009 Sintorn ................ B60G 15/061 188/266.2
2009/0200127 A1 * 8/2009 Janes ........................ F16F 9/44 188/314
2009/0277734 A1 * 11/2009 Cox .......................... F16F 9/18 267/221
2011/0083929 A1 * 4/2011 Marking ................ B60G 17/08 188/267.2
2011/0101579 A1 * 5/2011 Polakowski .......... F16F 9/3235 188/313
2011/0155524 A1 * 6/2011 Crasset ................... F16F 9/064 188/316
2011/0221108 A1 * 9/2011 Uchiyama ............. F16F 9/5126 267/217
2012/0048665 A1 * 3/2012 Marking ............... F16F 9/3235 188/315
2012/0152671 A1 * 6/2012 Murakami .............. F16F 9/187 188/315
2015/0159727 A1 * 6/2015 Park ...................... F16F 9/5126 188/280
2015/0211595 A1 * 7/2015 Ikeda ...................... F16F 9/466 188/314
2015/0377262 A1 * 12/2015 Besliu ................ F15B 15/1457 92/143
2017/0080767 A1 * 3/2017 Yamashita .............. F16F 9/504
2017/0261061 A1 * 9/2017 Chikamatsu ............ F16F 9/366
2018/0087594 A1 * 3/2018 Tomiuga ............... F16F 9/3228
2018/0156302 A1 * 6/2018 Kus ......................... F16F 9/585
2018/0216692 A1 * 8/2018 Coaplen .................. F16F 9/466
2019/0136935 A1 * 5/2019 Hulstein ................. F16F 9/446
2019/0154100 A1 * 5/2019 Coaplen ............... B60G 15/062
2019/0203798 A1 * 7/2019 Cox .......................... F16F 9/18
2020/0011395 A1 * 1/2020 Sankaran .................. F16F 9/49
2020/0049221 A1 * 2/2020 Anderson ................. F16F 9/48
2020/0094913 A1 * 3/2020 Wallen .................... F16F 9/065
2021/0018061 A1 * 1/2021 Lun ........................... F16F 9/43
2021/0088097 A1 * 3/2021 Mohammadi ............. F16F 9/19
2021/0088100 A1 * 3/2021 Woelfel .................. F16F 9/469
2021/0101434 A1 * 4/2021 Sawarynski, Jr. . B60G 17/0152
2021/0239177 A1 * 8/2021 Siodmok ................... F16F 9/43
2021/0253194 A1 * 8/2021 Morishita .............. B62K 21/02
2021/0354778 A1 * 11/2021 Oike ..................... F16F 13/007
2022/0041029 A1 * 2/2022 Randall ..................... F16F 9/10
2022/0049753 A1 * 2/2022 Deferme ................... F16F 9/34
2024/0093751 A1 * 3/2024 Hakoishi ............... F16F 9/3242

* cited by examiner

INTERNAL FLOATING PISTON

CROSS-REFERENCE TO RELATED APPLICATIONS (PROVISIONAL)

This application claims priority to and the benefit of U.S. Provisional Patent Application No. 63/224,363 filed on Jul. 21, 2021, entitled “IMPROVED INTERNAL FLOATING PISTON” by Matthew Stewart, and assigned to the assignee of the present application, the disclosure of which is hereby incorporated by reference in its entirety.

BACKGROUND ART

Many vehicles have a limited amount of space in which to package the required suspension. Often the space places a limit on the length of the shock, which often necessitates the use of external reservoirs or piggyback chambers. However, in some cases the space around the shock may be limited as well. For example, the front suspension area of many vehicles contains parts such as the axel and CV joints, sway bar and end link, tie rod, control arm, etc. These packaging requirements may be found in many vehicle segments such as on road vehicles, four-wheel drive vehicles, mass produced vehicles, and so forth. While the invention is discussed in terms of such vehicles, it should be understood that the application may easily apply to other vehicles such as, for example, bicycles.

With such a restricted packaging envelope in cases such as the above, where there is no room for external reservoirs or piggyback chambers, it becomes necessary to design a shock of a shorter length with no decrease in performance.

BRIEF DESCRIPTION OF THE DRAWINGS

The accompanying drawings, which are incorporated in and form a part of this specification, illustrate embodiments of the present technology and, together with the description, serve to explain the principles of the present technology.

FIG. 1 shows a cross section view of a shock absorber with an internal floating piston.

DETAILED DESCRIPTION OF THE EMBODIMENTS

Figure 2:
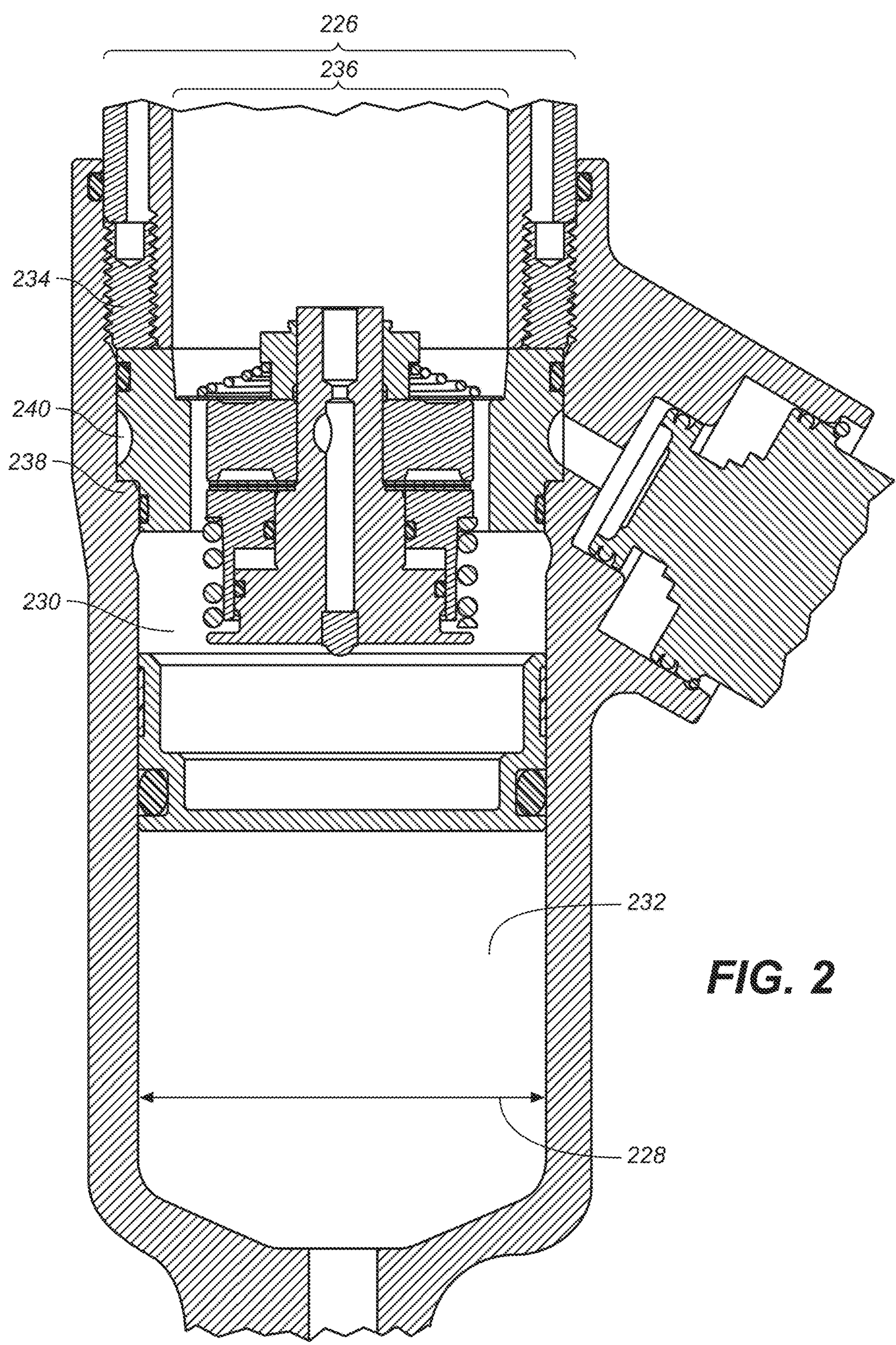
FIG. 2 shows a close-up cross section view of the body cap and internal floating piston.

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention and should not necessarily be construed as preferred or advantageous over other embodiments. In some instances, well known methods, procedures, and objects have not been described in detail as not to unnecessarily obscure aspects of the present disclosure.

When there is a limitation on the length of a shock, traditional art usually suggests utilizing a remote reservoir or a piggyback chamber. However, where there is a tight packaging envelope there may not be room for such solutions. The present invention aims for a solution that can be fit in the same envelope as a traditional inline shock and does not require additional room around the shock. As such, the present invention does not require the use of a remote reservoir or piggyback chamber but does not sacrifice performance for the lack of these add-ons.

Figure 1:
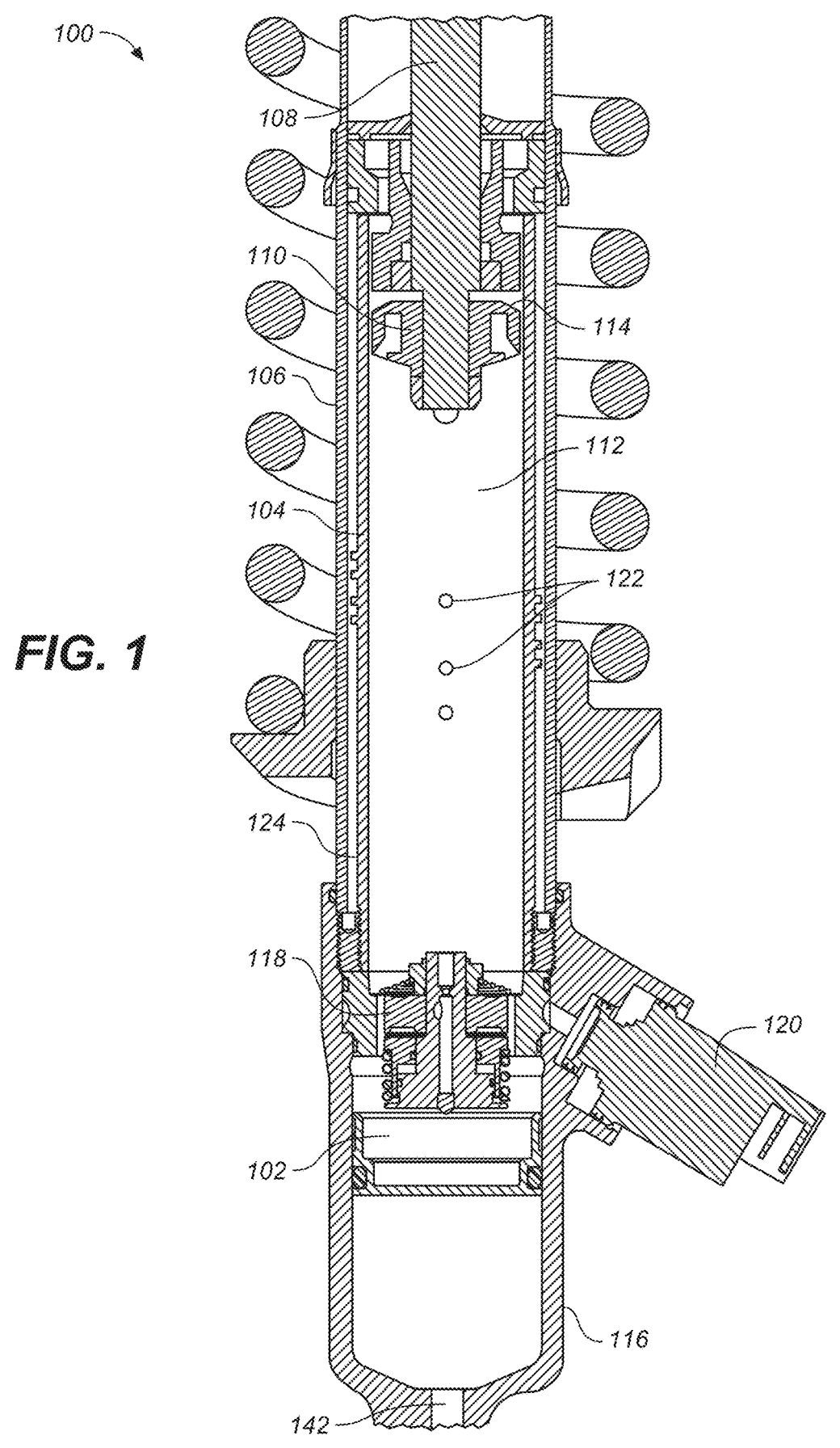

FIG. 1 shows a cross section view of a shock absorber 100 with an internal floating piston 102. Internal floating piston 102 may also be referred to as a mismatched internal floating piston. FIG. 1 also includes internal cylinder 104, external cylinder 106, rod 108, main damping piston 110 which divides the internal cylinder 104 into a compression side 112 and a rebound side 114, a body cap 116, a base valve piston 118, and an electronic valve assembly 120.

In one embodiment, shock absorber 100 is a twin tube shock with an internal bypass. In this embodiment, there is at least one hole 122 in the wall of internal cylinder 104. These holes allow fluid to flow into the gap between the internal cylinder 104 and the external cylinder 106, or the internal bypass 124. In one embodiment, the holes 122 are staggered to have an increase in damping force as the shock is compressed.

In the embodiment shown in FIG. 1, the external cylinder has an external cylinder outer diameter, and the internal cylinder is concentrically disposed within the external cylinder. The main damping piston 110 is coupled to the rod 108 and configured for operation within the internal cylinder 104. The main damping piston 110 is also configured to divide the internal cylinder 104 into a compression side 112 and a rebound side 114.

FIG. 2 shows a close-up cross section view of the body cap 204 and internal floating piston 102. The body cap 116 is disposed at one end of the external cylinder 106, and the body cap 116 has a first inner diameter 226 fit to match the external cylinder outer diameter. In other words, the first inner diameter 226 may slidably fit around the external cylinder 106. In order to keep the surface sealed, there is an O-ring between the body cap 116 and external cylinder 106.

The body cap 116 also has a second inner diameter 228 that is greater than the internal cylinder inner diameter 236. The internal floating piston 102 is disposed within the body cap 116 and is configured to divide the body cap 116 into a first side 230 and a second side 232. Base valve piston 118 is disposed to separate the compression side 112 from the first side 230.

Due to the second inner diameter 228 being larger than the inner diameter of the internal cylinder 236, the diameter of the internal floating piston 102 is also larger than the standard design. With the bore for the internal floating piston 102 being larger than the bore of the inner cylinder 104, and the increased surface area of the internal floating piston 102, the overall length of the shock is decreased while the overall stroke remains the same.

The length reduction allowed by the larger internal floating piston 102 in the shock will be a function of the ratio between the area of the second inner diameter 228 and the inner diameter of the internal cylinder 236.

As an example, in one embodiment the second inner diameter is a 2.25 inch bore and the inner diameter of the internal cylinder is a 1.834 inch bore. In these sizes, the larger internal floating piston has an area that is 1.505 times larger than that of the smaller inner diameter of the internal cylinder. This factor can be used to directly determine the shock length decrease allowed by the larger internal floating piston as the larger internal floating piston needs 1.505 times less distance to travel for the same shock stroke. For example, if the shock stroke dictates the need for 3 inches of internal floating piston travel while using the 1.834 inch diameter internal floating piston, the required travel would be reduced to 1.99 inches by switching to the 2.25 inch diameter internal floating piston. The shock length reduction will be very similar to the internal floating piston travel reduction, with slight variations to allow for changes in internal geometries and volumes. It should be noted that the above numbers are given for the sake of clarity and brevity and are not meant to be limiting the scope of the invention.

In one embodiment, the larger diameter of the internal floating piston 102 allows for a decrease in the amount of pressure within the body cap 116.

In one embodiment, cinch ring 234 is used to connect the body cap 116 to the internal cylinder 104. In this embodiment, cinch ring 234, body cap 116, and internal cylinder 104 are all threadedly connected as seen in at least FIG. 2, with internal cylinder 104 threading into cinch ring 234 and bottoming out against base valve piston 118. Similarly, the external cylinder 106 bottoms out against the chinch ring 234.

The internal floating piston 102 also allows for thermal expansion of the working fluid or oil, as well as typical shaft displacement. In one embodiment, the internal floating piston 102 bottoms out against the base valve piston 118.

In one embodiment, a fill valve 142 allows for the pressure in the second side 232 to be changed.

Cinch ring 234 threadedly connecting the components is what allows for the architecture change. Cinch ring 234 also assists in clamping the base valve piston 118 into the body cap, with base valve piston 118 resting against a ledge 238 on the opposite end.

With the changes to body cap 116, base valve piston 118 also has some adjustments. Base valve piston 118 has a larger diameter, and there is now a groove 240 around the circumference of base valve piston 118 that was previously part of body cap 116.

Due to the increased complexity of the design of the body cap 116, high quality manufacturing capabilities are key in making the present invention operate smoothly. The present invention is able to meet typical OEM requirements while still providing the promised suspension performance.

In one embodiment, the present invention works with standard legacy parts. By using legacy parts, there are fewer custom components required and the invention is more cost efficient.

In one embodiment, the shock absorber is a semi-active shock absorber with components such as electronic valve assembly 120. In one embodiment, the shock absorber is a standard shock with no electronic damping components. In another embodiment, the shock features a mechanically controlled adjustable base valve assembly.

In one embodiment, not shown, the shock does not have an internal bypass and is a monotube shock. In this embodiment, there is a cylinder with a rod and a main damping piston, the main damping piston being coupled to the rod and configured for operation within the cylinder. The main damping piston is also configured to divide the cylinder into a compression side and a rebound side. In this embodiment, there is a body cap disposed at one end of the cylinder, wherein the body cap has a second inner diameter greater than an internal diameter of the cylinder. There is also an internal floating piston disposed within the body cap and configured to divide the body cap into a first side and a second side. Finally, a base valve piston is disposed to separate the compression side from the first side. It should be understood previously discussed additional embodiments may also apply to the monotube embodiment. In one embodiment, the body cap may have a first inner diameter fit to match an external diameter of the cylinder.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A shock absorber comprising:

a cylinder;

a rod;

a main damping piston, the main damping piston coupled to the rod and configured for operation within the cylinder, the main damping piston configured to divide the cylinder into a compression side and a rebound side, said rod disposed coaxially with a central axis of said cylinder, said rod configured to move along said central axis and into or out of said cylinder;

a body cap disposed at one end of the cylinder, wherein the body cap has a second inner diameter greater than an inner diameter of the cylinder, such that a volume per axial length of said body cap is greater than a volume per axial length of said cylinder, wherein an overall length of said shock absorber is reduced while an overall stroke characteristic of said shock absorber remains unchanged, said reduction in said overall length of said shock absorber being a function of a ratio between said second inner diameter of said body cap and said inner diameter of said cylinder, wherein when said rod moves along said central axis and into said cylinder, said rod moves toward said body cap, and wherein when said rod moves along said central axis and out of said cylinder, said rod moves away from said body cap;

a fill valve fluidically coupled with said body cap;

an internal floating piston disposed within the body cap, configured to divide the body cap into a first side and a second side; and a base valve piston disposed to separate the compression side from the first side.

2. The shock absorber of claim 1 further comprising:

an external cylinder, the external cylinder having an external cylinder outer diameter.

3. The shock absorber of claim 2 wherein, the body cap has a first inner diameter fit to match the external cylinder outer diameter.

4. The shock absorber of claim 2 wherein, the cylinder has at least one hole to fluidly connect the compression side and the rebound side via an internal bypass.

5. The shock absorber of claim 1 further comprising:

a cinch ring to threadedly couple the body cap to the cylinder.

6. The shock absorber of claim 1 wherein, a remote reservoir is not required for operation.

7. The shock absorber of claim 1 wherein, the internal floating piston bottoms out against the base valve piston.

8. The shock absorber of claim 1 wherein, said fill valve allows for the pressure in the second side to be changed.

9. The shock absorber of claim 1 wherein, the internal floating piston has a diameter configured to slidably move axially along said second inner diameter of said body cap, said diameter of said internal floating piston allowing a decrease in the amount of pressure within the body cap.

10. A shock absorber comprising:

an external cylinder, the external cylinder having an external cylinder outer diameter;

an internal cylinder concentrically disposed within the external cylinder, the internal cylinder having an internal cylinder inner diameter;

a rod, said rod disposed coaxially with a central axis of said cylinder, said rod configured to move along said central axis and into or out of said cylinder;

a main damping piston, the main damping piston coupled to the rod and configured for operation within the internal cylinder, the main damping piston configured to divide the internal cylinder into a compression side and a rebound side;

a body cap disposed at one end of the external cylinder, wherein the body cap has a first inner diameter fit to match the external cylinder outer diameter, wherein the body cap has a second inner diameter that is greater than the internal cylinder inner diameter, such that a volume per axial length of said body cap is greater than a volume per axial length of said cylinder, wherein an overall length of said shock absorber is reduced while an overall stroke characteristic of said shock absorber remains unchanged, said reduction in said overall length of said shock absorber being a function of a ratio between said second inner diameter of said body cap and said internal cylinder inner diameter, wherein when said rod moves along said central axis and into said cylinder, said rod moves toward said body cap, and wherein when said rod moves along said central axis and out of said cylinder, said rod moves away from said body cap;

a fill valve fluidically coupled with said body cap;

an internal floating piston disposed within the body cap, configured to divide the body cap into a first side and a second side; and a base valve piston disposed to separate the compression side from the first side.

11. The shock absorber of claim 10 further comprising:

a cinch ring to threadedly couple the body cap to the internal cylinder.

12. The shock absorber of claim 10 wherein, a remote reservoir is not required for operation.

13. The shock absorber of claim 10 wherein, the internal cylinder has at least one hole to fluidly connect the compression side and the rebound side via an internal bypass.

14. The shock absorber of claim 10 wherein, the internal floating piston bottoms out against the base valve piston.

15. The shock absorber of claim 10 wherein, said fill valve allows for the pressure in the second side to be changed.

16. The shock absorber of claim 10 wherein, the internal floating piston has a diameter configured to slidably move axially along said second inner diameter of said body cap, said diameter of said internal floating piston allowing a decrease in the amount of pressure within the body cap.

17. A shock absorber comprising:

an external cylinder, the external cylinder having an external cylinder outer diameter;

an internal cylinder concentrically disposed within the external cylinder, the internal cylinder having an internal cylinder inner diameter;

a rod, said rod disposed coaxially with a central axis of said cylinder, said rod configured to move along said central axis and into or out of said cylinder;

a main damping piston, the main damping piston coupled to the rod and configured for operation within the internal cylinder, the main damping piston configured to divide the internal cylinder into a compression side and a rebound side;

a body cap disposed at one end of the external cylinder, wherein the body cap has a first inner diameter fit to match the external cylinder outer diameter, wherein the body cap has a second inner diameter that is greater than the internal cylinder inner diameter, such that a volume per axial length of said body cap is greater than a volume per axial length of said cylinder, wherein an overall length of said shock absorber is reduced while an overall stroke characteristic of said shock absorber remains unchanged, said reduction in said overall length of said shock absorber being a function of a ratio between said second inner diameter of said body cap and said internal cylinder inner diameter, wherein when said rod moves along said central axis and into said cylinder, said rod moves toward said body cap, and wherein when said rod moves along said central axis and out of said cylinder, said rod moves away from said body cap;

a fill valve fluidically coupled with said body cap;

a cinch ring to threadedly couple the body cap to the internal cylinder;

an internal floating piston disposed within the body cap, configured to divide the body cap into a first side and a second side, wherein the internal floating piston has a diameter configured to slidably move axially along said second inner diameter of said body cap, said diameter of said internal floating piston allowing a decrease in the amount of pressure within the body cap; and a base valve piston disposed to separate the compression side from the first side.

18. The shock absorber of claim 17 wherein, a remote reservoir is not required for operation.

19. The shock absorber of claim 17 wherein, the internal cylinder has at least one hole to fluidly connect the compression side and the rebound side via an internal bypass.

20. The shock absorber of claim 17 wherein, the internal floating piston bottoms out against the base valve piston.

* * * * *